US006543460B1

(12) United States Patent
Denes et al.

(10) Patent No.: US 6,543,460 B1
(45) Date of Patent: Apr. 8, 2003

(54) COLD-PLASMA TREATMENT OF SEEDS TO REMOVE SURFACE MATERIALS

(75) Inventors: Ferencz S. Denes, Madison, WI (US); Raymond A. Young, Madison, WI (US); Sorin Manolache, Madison, WI (US); John C. Volin, Fort Lauderdale, FL (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/602,368

(22) Filed: Jun. 23, 2000

Related U.S. Application Data

(60) Provisional application No. 60/141,045, filed on Jun. 24, 1999.

(51) Int. Cl.[7] ................................................. B08B 7/04

(52) U.S. Cl. .......................................... 134/1.1; 216/67

(58) Field of Search ............................... 216/58, 63, 67; 156/345; 438/1; 134/1, 1.1; 422/21, 22, 906, 907; 204/164, 165

(56) References Cited

U.S. PATENT DOCUMENTS

| | | | |
|---|---|---|---|
| 4,919,659 A | 4/1990 | Horbett et al. | 623/1 |
| 5,262,208 A | 11/1993 | Krapivina et al. | 427/491 |
| 5,281,315 A | 1/1994 | Krapivina et al. | 204/164 |
| 5,328,576 A | 7/1994 | Paskalov et al. | 204/164 |
| 5,344,462 A | 9/1994 | Paskalov et al. | 68/115.52 |
| 5,531,834 A | 7/1996 | Ishizuka et al. | 118/723 I |
| 5,554,223 A * | 9/1996 | Imahashi | 118/723 |
| 5,868,919 A | 2/1999 | Babington et al. | 205/688 |
| 6,054,018 A | 4/2000 | Denes et al. | 156/345 |
| 6,060,129 A | 5/2000 | Thomas et al. | 427/490 |
| 6,082,292 A | 7/2000 | Denes et al. | 118/718 |
| 6,096,564 A | 8/2000 | Denes et al. | 438/1 |

FOREIGN PATENT DOCUMENTS

| | | |
|---|---|---|
| DE | 4414263 A | 10/1995 |
| EP | 0343038 A | 11/1989 |
| FR | 2580897 A | 10/1986 |

OTHER PUBLICATIONS

Gustafson LLC web site material on commercial seed Treaters, Lab & Portable Treaters for Seeds, and Blending Chambers for seeds, dated Jun. 1, 1999.
"CelPril Film Coatings Becoming More Popular As Worker Safety Concerns Rise," Seed Trade News, Apr. 1999, p. 17.
F. Denes, et al., "Synthesis and Surface Functionalization Under Cold–Plasma Conditions," J. of Photopolymer Science and Technology, vol. 12, No. 1, _, 1999, pp. 27–38.
Database EPODOC 'Online! (abstract) European Patent Office, The Hague, NL; PN: CN 1067350 A, China, Univ Zhejiang, "Treatment of Plant Seeds," XP002150335, Dec. 30, 1992.
Database WPI, (abstract), Section PQ, Week 199744, Derwent Publications Ltd., London, GB; AN 1997–478235, XP002150302 & RU 2 076 555 C (Univ St Petersburg), Russia, Apr. 10, 1997.
Database WPI, (abstract), Section PQ, Week 198215, Derwent Publications Ltd., London, GB; XP002150303 & SU 843 804 B (Agric Electrif Res), Soviet Union, Jul. 7, 1981.

* cited by examiner

*Primary Examiner*—Frankie L. Stinson
*Assistant Examiner*—Joseph Perrin
(74) *Attorney, Agent, or Firm*—Foley & Lardner

(57) ABSTRACT

Seeds are treated in a cold plasma in a reaction chamber to etch the surface of the seeds to remove surface materials, such as fungicides and insecticides, or to disinfect the surfaces. The cold plasma process is carried out using etch gases which do not harm the seeds and for selected periods of time sufficient to remove surface materials without necessarily affecting the viability of live seeds after treatment. Tumbling the seeds while exposing the seeds to the plasma allows the surfaces of the seeds to be etched uniformly.

34 Claims, 4 Drawing Sheets

US 6,543,460 B1

COLD-PLASMA TREATMENT OF SEEDS TO REMOVE SURFACE MATERIALS

CROSS REFERENCE TO RELATED APPLICATION

This application claims the benefit of provisional application No. 60/141,045, filed Jun. 24, 1999, the disclosure of which is incorporated by reference.

This invention was made with United States government support awarded by the following agency: NSF Grant No. 8721545. The United States government has certain rights in this invention.

FIELD OF THE INVENTION

This invention pertains generally to the field of plasma processing of materials and particularly to plasma treatment of seeds.

BACKGROUND OF THE INVENTION

Seeds produced by commercial seed companies are commonly treated with insecticides and fungicides to enhance the survivability and germination rate of the planted seed. The fungicides and pesticides may be applied to the seed in a dry or wet form. A dry treatment involves application of the active ingredient in an inert dust which may contain additives to prevent agglomeration of the particles or "stickers" to enhance adhesion to the seed surface. Adhesion of dry particles to the seed surface is a complex process which involves molecular forces and physical trapping of small particles. Both molecular forces and physical trapping of particles are strongly dependent upon the particle size. Molecular forces of adhesion are very high per unit area and essentially depend on the surfaces that are in actual contact. Rough surfaces have low contact areas and, as a consequence, molecular forces generally play a less important role in adhesion between such surfaces. Physical entrapping of active particles is also related to the particle size. The porosity of the seed surfaces should be comparable with the average particle size to obtain efficient trapping of particles to the seed.

Wetting agents can also be used to allow powdery active materials to be applied to seeds using a slurry treatment. Such treatments usually are performed under low liquid volume conditions, but still have the disadvantage that the seeds generally must be dried afterwards, which increases the expense of the treatment process.

The result of such treatments, in whatever manner performed, is a fairly high concentration of active ingredients on the seed surfaces which, of course, enhances the utility of these seeds when planted in the normal course. However, for a variety of reasons, large quantities of treated seed either are not or cannot be used for planting within an appropriate time after the seeds have been treated. Often, seed companies treat more seeds than are expected to be used during a planting season to-ensure the availability of seeds in a subsequent season if there is an intervening crop failure. In most years, the additional seed is not planted. Over long storage times, the active ingredients in the surface treatments may degrade, leading to the formation of secondary compounds which are not active for the intended purpose of the surface treatment. However, such contaminants may present fairly high toxicity levels. Thus, such overaged treated seed is not acceptable for use as seeds for planting or for human or animal feed. Wet-chemical removal of fungicide, pesticide or insecticide contaminants from seeds would require large quantities of liquids (water, organic solvents) and expensive drying technologies. In addition, the combination of long storage times and liquid treatments may enhance the penetration of the surface borne chemicals into the seeds, potentially damaging or killing the seeds. Seeds with cracks or exposed embryos, such as from thresher damage or ventilation, may absorb even higher quantities of the surface borne toxins.

SUMMARY OF THE INVENTION

In accordance with the present invention, seeds are treated by exposing the seeds to a cold plasma to etch the surface of the seeds to remove surface materials, such as fungicide and insecticide chemicals, and/or to disinfect the surface. The cold plasma etching process may be carried out employing etch gases which are not themselves harmful to the seeds, and for selected periods of time sufficient to remove surface materials such as chemicals or other contaminants without significantly affecting the viability of the live seeds.after treatment. The plasma treatment process can be carried out .under conditions allowing removal of a selected thickness of surface material from the seeds with precision. In addition, because the plasma treatment process is carried out under dry conditions, no additional moisture need be added to the seeds during the treatment process, and moisture may even be removed from the seeds during the plasma treatment.

A cold plasma process in accordance with the invention has several advantages over liquid-based treatment processes for detoxification of seeds or removal of surface materials from seeds. Because large quantities of liquids, such as solvents, are not needed, and only small amounts of gas-phase materials are required, the process has much less environmental impact than liquid-based processes. Because of the low pressures under which the plasma reactions develop, minimal quantities of the plasma gases are required to sustain the plasma discharge. The plasma processing conditions can be selected so that the plasma species penetrate and interact only with the very top layers of a seed, leaving the bulk of the seed unaffected. The plasma species can interact efficiently with the surface layer molecules, and regardless of the nature of such molecules, molecular fragmentation (etching) of the surfaces can take place. Various plasma process parameters, such as power coupled to the plasma, gas pressure, and treatment time, can be selected to tailor the etch rate and the nature of the gas-phase components that result after the treatment. The molecules or molecular fragments resulting from the etching process usually are gas-phase components which can easily be removed from the system. Depending on the nature of the plasma gases employed, which may be inert or reactive gases (e.g., argon, $CF_4$, air, oxygen, water vapor, etc.), the etch rates and the chemical nature of the resulting volatile components (toxic or non-toxic derivatives) can also be controlled and tailored to specific process requirements. The plasma generated gas-phase components that result from the process can be easily trapped and disposed of if they constitute hazardous waste or, if non-hazardous, may be released to the environment.

In a preferred method of treating seeds in accordance with the invention, the seeds to be treated are enclosed in a reaction chamber, the reaction chamber is evacuated to a base level, and a selected source gas is supplied to and a selected pressure established in the reaction chamber. The gas may be provided from an external gas source and is selected to yield a desired etch characteristic and not a deposit during the processing. The gas may constitute water vapor emitted from the seeds themselves as the pressure within the reaction chamber is reduced below atmospheric. Further, multi-step processes may be carried out. For example, an initial cold plasma may be ignited in the water vapor evolved from the seeds, and the seeds may be exposed to this plasma for a selected period of time. An external gas may then be introduced into the reaction chamber and the cold plasma ignited in the external source gas. The gas in the chamber may be ignited by coupling RF power to the gas in the chamber in various ways, including capacitive coupling and inductive coupling. In addition, the RF power may be coupled in pulses to the plasma in the reaction chamber.

Virtually any type of seed can be treated in accordance with the present invention. The invention has particular application to seed corn which is conventionally treated with insecticides and fungicides. After treatment in accordance with the present invention to plasma etch the surface borne chemicals therefrom, the corn or other seeds may be used for animal feed, or may be retreated with insecticides, etc. at a later time so that the seeds will be properly treated for use in a later growing season.

Gases that may be employed in accordance with the present invention may be any of the various reactive gases which will provide plasma etching in a cold plasma process. For example, gases including, but not limited to, argon, $CF_4$, air, oxygen, water vapor, and mixtures thereof may be used in the process.

Cold plasma treatment in accordance with the present invention may also be employed to reduce the amount of extraneous flakes and dust intermixed with the seed by physical ablation of such materials or by oxidation, thus providing a cleaner bulk seed product after treatment with less dust (possibly carrying toxic particles) than is typically the case with normal bulk seeds.

A cold plasma etching process in accordance with the invention may also be carried out on either treated or untreated seed, to remove all or part of the surface layers of the seed for various purposes, including affecting the germination rates of the seed by, e.g., changing the water absorption characteristics of the seed surfaces. The plasma etching process may be carried out to remove selected depths of the surface layers of the seed, including, if desired, entire removal of the pericarp.

Further objects, features, and advantages of the invention will be apparent from the following detailed description when taken in conjunction with the accompanying drawings.

DETAILED DESCRIPTION OF THE INVENTION

The present invention encompasses cold plasma removal of material from the surfaces of seeds. If desired, such a process can be carried out without significantly affecting the viability of the seeds. Cold plasmas are non-thermal and non-equilibrium plasmas. The plasma temperatures are near normal atmospheric temperatures and generally well below the boiling point of water. In contrast, hot plasmas are thermal or equilibrium plasmas. In a cold plasma, the kinetic energy of the electrons in the plasma is high while the kinetic energy of the atomic and molecular species is low. On the other hand, in a hot plasma, the kinetic energy of all species is high. Consequently, organic materials would be damaged or destroyed in a hot plasma. It has been discovered in accordance with the present invention that appropriate cold plasma treatment of living matter, such as seeds, not only does not destroy the seeds, but allows the seeds to remain viable so that they will germinate when planted under appropriate conditions.

Figure 1:
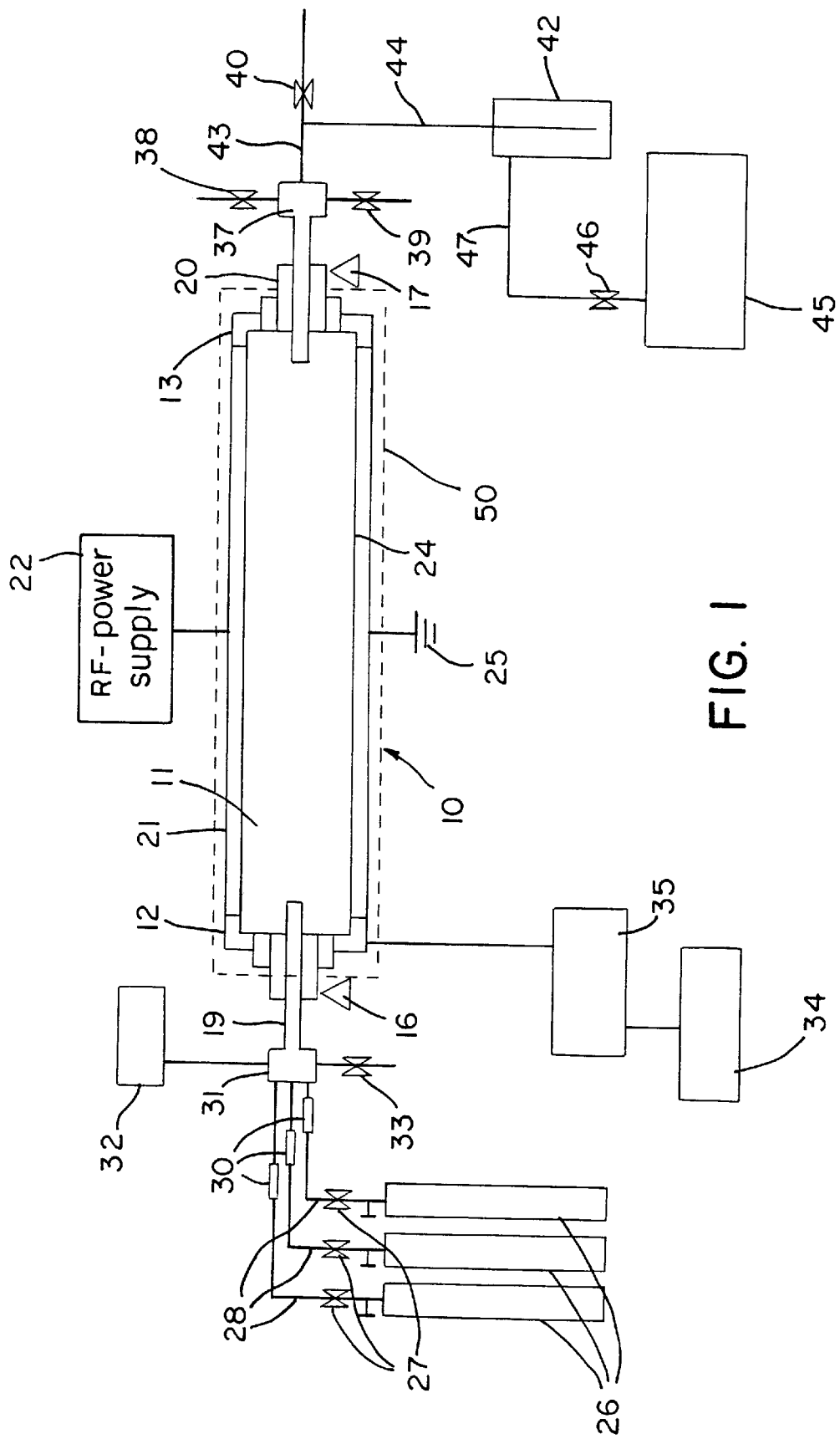
FIG. 1 is a schematic view of a plasma reactor system for carrying out the present invention.

With reference to FIG. 1, an exemplary cold plasma reactor system which may be utilized to carry out the invention is shown generally at 10. The reactor system 10 includes a cylindrical reaction vessel 11 (e.g., formed of Pyrex® glass, 1 m long and 10 cm inside diameter) which is closed at its two ends by disk shaped stainless steel end sealing assemblies 12 and 13. The end sealing assemblies 12 and 13 are mounted to mechanical support bearings 16 and 17 which engage the sealing assemblies 12 and 13 to enable rotation of the reaction vessel 11 about its central axis, i.e., the central axis of the cylindrical reaction vessel. Hollow shaft (e.g., 0.5 inch inside diameter) ferrofluidic feedthroughs 19 and 20 extend through the end sealing assemblies 12 and 13, respectively, to enable the introduction of gas into and the exit of gas from the reaction chamber. A semi-cylindrical, exterior copper upper electrode 21 is connected to a power supply 22, and a lower, similar exterior semi-cylindrical copper electrode 24 is connected to ground (illustrated at 25). The two electrodes 21 and 24 closely conform to the cylindrical exterior of the reaction vessel 11, are spaced slightly therefrom, and together extend over most of the outer periphery of the reaction vessel, but are spaced from each other at their edges a sufficient distance to prevent arcing or discharge between the two electrodes 21 and 24. The foregoing electrode arrangement is only exemplary of the many electrode arrangements that may be used to couple power to the plasma. For example, a central internal electrode (not shown) may be extended into the reaction chamber along the central axis rather than using external electrodes.

The present invention allows seeds to be surface etched with cold plasmas provided from a variety of source gases. The source gases may be held in containers 26, e.g., storage tanks. The source gases in the containers 26 may be a variety of gases (e.g., argon, ammonia, air, oxygen, $CF_4$, etc.) which are typically compressed under pressure. The source gas may also be provided from other sources, solid or liquid, that are appropriately volatized, and may comprise aerosols of liquid or solid particulates, such as water vapor, all of which shall be referred to herein as a "gas". The flow of gas from a source cylinder 26 may be controlled by needle valves and pressure regulators 27 which may be manually or automatically operated. The gas that passes through the control valves 27 is conveyed along supply lines 28 through flow rate controllers 30 to a gas mixing chamber 31 (e.g., preferably of stainless steel). An MKS pressure gauge 32 (e.g., Baratron) is connected to the mixing chamber 31 to monitor the pressure thereof. A supplementary valve 33 is connected to the mixing chamber 31 to allow selective venting of the chamber as necessary. The mixing chamber 31 is connected to the feedthrough 19 that leads into the interior of the reaction vessel 11.

A, e.g., digital controller 34 may be employed to control a driver motor 35 that is coupled to the reaction vessel 11 to provide controlled driving of the reaction vessel 11 in rotation. The reactor vessel 11 may be rotated by the drive motor 35 at various selected rotational speeds (e.g., 30–200 rpm).

The second feedthrough 20 is connected to an exhaust chamber 37, which is coupled via selectively openable exhaust valves 38, 39 and 40, to conduits for exhausting to the atmosphere or to an appropriate recovery system or other disposal route of the exhaust gases in the exhaust chamber 37.

A liquid nitrogen trap 42 may be connected to an exhaust line 43 which extends from the chamber 37 by stainless steel tubing 44. The trap 42 may be formed, e.g., of stainless steel (25 mm inside diameter). A mechanical pump 45 is connected through a large cross-section valve 46 via a tube 47 to the trap 42 to selectively provide a vacuum draw on the reactor system 10 to evacuate the interior of the reaction vessel 11 to a selected level. It is preferred that the vacuum pump and associated connections allow the pressure in the reaction chamber within the vessel to be selectively reduced down to 30 mT.

The power supply 12 is preferably an RF power supply (e.g., 13.56 MHz, 1,000 W) which, when activated, provides RF power between the electrodes 21 and 24 to capacitively couple RF power to the gas in the reaction chamber within the reaction vessel 11. Conventional coils for inductively coupling RF power to the plasma may also be used (e.g., a coil extending around the reaction vessel 11). A Faraday cage 50 is preferably mounted around the exterior of the reaction vessel to provide RF shielding and to prevent accidental physical contact with the electrodes.

The reactor vessel may be rotated by the drive motor 35 at various selected rotational speeds (e.g., 30–200 rpm), and it is preferred that the vacuum pump and associated connections allow the pressure in the reaction chamber within the vessel to be selectively reduced down to 30 mT.

The following are examples of commercial parts that may be incorporated in the system 10: RF-power supply 22 (Plasma Therm Inc., RTE 73, Kresson, N.J. 08053; AMNS-3000 E; AMNPS-1); mechanical vacuum pump 45 (Leibold-Heraeus/Vacuum Prod. Inc., Model: D30AC, Spectra Vac Inc.); pressure gauge 32 (MKS Baratron, Model: 622AO1TAE); digitally controlled rotating system 34, 35 (DC motor, Model 4Z528, Dayton Electric Mfg. Co.; DART Controls Inc. controller).

In utilizing the plasma treatment system 10 in accordance with the invention, it is generally preferred that a plasma-enhanced cleaning of the reactor be conducted prior to treatment to eliminate possible contaminants. An exemplary cleaning step includes introduction of oxygen gas from one of the tanks 26 into the reaction chamber and ignition of a plasma in the gas at, e.g., a power level of 300 W, a gas pressure of 250 mT, an oxygen flow rate of 6 sccm, and a typical cleaning period of 15 minutes.

For carrying out treatment of seeds in accordance with the invention, the reactor is opened to allow access to the interior of the reaction vessel 11 by disconnecting one of the vacuum sealing assemblies 19 or 20 from the cylindrical reaction vessel, and inserting the seeds into the interior of the vessel, followed by resealing of the assemblies into vacuum tight engagement with the reaction vessel 11. Sealable ports may also be provided in the sealing assemblies. The pump 45 is then operated to evacuate the plasma reactor to a desired base pressure level based on the seed origin water vapor or the artificially supplied plasma gases and vapors. The desired gas is then introduced from the source containers 26, and a desired gas pressure level in the reaction chamber is established. The RF power supply 22 is then turned on (generally, it is preferred that the power be supplied in pulses) to ignite the plasma in the gas introduced into the reaction chamber defined by the reaction vessel 11 and the end sealing assemblies 12 and 13. For treating seeds, it is preferred that the drive motor 35 be operated to rotate the reaction chamber 11 to tumble the seeds during the plasma reaction process so that all surfaces of the seeds are exposed to the plasma for a relatively uniform period of time to enable the surfaces of the seeds to be uniformly etched. Because the seeds are exposed to a dry gas during plasma treatment, no additional moisture need be introduced into the seeds, and because of the evacuation of the chamber below atmospheric pressure, some removal of moisture from the seeds during plasma processing can be obtained if desired. After a period of time selected to sufficiently remove a selected material from the surface of the seeds has elapsed, the power supply 22 is turned off. The pump 45 is then operated to evacuate the reaction chamber to draw out the remaining source gases and any byproducts. These can be vented to the atmosphere or disposed of as appropriate. Atmospheric air, or another selected gas, is then introduced into the chamber to bring the pressure in the reaction chamber to normal atmospheric pressure. One of the sealing assemblies 12 or 13 is then opened to allow removal of the treated seeds.

If desired, the plasma treatment processes can be periodically stopped to allow samples of the seeds to be collected for analytical and biological evaluations.

In addition to the preferred RF plasma reaction apparatus discussed above, the invention may be carried out using other plasma treatment apparatus, including static inductively or capacitively coupled RF plasma reactors, DC-discharge reactors, and atmospheric pressure barrier discharges. Such apparatus are not preferred for certain applications of the invention. Static reactors may yield non-uniform treatment of the seeds or other material. Atmospheric pressure discharges usually require a narrow electrode gap, and they generally cannot uniformly expose the seed (or other particulate matter) surfaces to the discharge. Additionally, because of the particulate nature of seeds, etc., the ability to use vacuum tight seals is limited, which may result in contamination problems. Barrier discharge processes are also less efficient because of the short free path of the plasma particles and, consequently, the fast recombination of the active species in the gas phase.

The active species of the plasma, including charged and neutrals species, have energies comparable with the chemical bonds of organic compounds, and consequently these species can cleave molecules and accordingly can generate active molecular fragments, such as: atoms, free radicals, ions of either polarity, etc. These molecular fragments, assisted by electrons and photons, generate specific gas phase and surface recombination reaction mechanisms which can lead to the formation of new molecular or macromolecular structures, and to the extraction of low molecular weight, volatile molecular fragments of substrate origin.

By controlling the external (power, pressure, flow rate, etc.) and internal (energy distribution of charged and neutral species, particle densities, etc.) plasma parameters these processes can be tailored for purposes of the present invention for predominant fragmentation processes to etch surface material from the seeds.

Other factors like molecular structures, gas composition, and pulsing characteristics also can influence significantly the nature of the plasma-mediated reaction mechanisms. Carbon tetrafluoride plasmas do not deposit fluorinated macromolecular layers under common RF-cold-plasma conditions due to the intense etching effects related to the high plasma-generated fluorine atomic concentrations. However, the presence in the gas mixture of fluorine atom scavengers (e.g., hydrogen) allow the deposition of macromolecular layers. There are species which, due to their molecular structures, never can deposit macromolecular layers, like oxygen, chlorine, ammonia, nitrogen, etc. In the present invention, the source gas (including mixtures) are utilized under process conditions that result in surface etching rather than surface deposit.

As an example of the cold plasma removal of surface material from seeds in accordance with the invention, plasma cleaning of corn treated with Captan 50 W, a commercially available brand of agricultural fungicide, was performed in the plasma reaction apparatus 10 as described above. The seeds were treated in a two-step process. The first step used a plasma generated from water vapor emitted from the seeds. The second step utilized an oxygen gas from an external source in which the plasma was ignited. During this surface cleaning process, the following conditions were utilized: RF power of 20 W; pressure in the plasma reactor of 600 mT; temperature in the reactor of 25° C.; oxygen flow rate of 2 sccm; and treatment times of 15 or 30 minutes for the water vapor plasma and 15 minutes for the oxygen plasma.

At the end of the plasma cleaning step, the corn seeds were removed from the reactor and stored in unsealed polyethylene bags until analytical work was carried out on the corn. Captan-treated corn control samples and the Captan-treated and plasma-cleaned corn samples were alcohol (ethanol) extracted, and the contents of the solution were analyzed by gas chromatography-mass spectroscopy (GC-MS), to allow the Captan concentrations from the seed surfaces of the samples to be evaluated. The untreated and treated seeds (10 pieces of corn per each sample) were extracted for 10 minutes with 10 mL ethyl alcohol. One $\mu$L of solution was injected into a Hewlett-Packard GC-6890+/MSD 5973 system for gas chromatographic (GC) separation and mass spectrographic identification of chemical products. The data obtained from the chromatographic analyses are summarized in Table 1 below.

TABLE 1

| # | Sample | Captan 50 W(C) 15.716 min peak (FIG. 4) Area | % | δ-4-Tetrahydro-phthalimide (T) 9.379 min peak (FIG. 3) Area | % | Ratio T/C |
|---|---|---|---|---|---|---|
| 1 | Untreated | 125868667 | 100.0 | 6869970 | 100.0 | 0.0546 |
| 2 | 15 min plasma treated | 27461035 | 21.8 | 2082733 | 30.3 | 0.0758 |
| 3 | 15 + 15 min plasma treated | 20050862 | 15.9 | 1560815 | 22.7 | 0.0784 |
| 4 | 15 + 15 min plasma treated and 15 min O$_2$ plasma treated | 5213547 | 4.1 | 525812 | 7.6 | 0.1008 |

Figure 2:
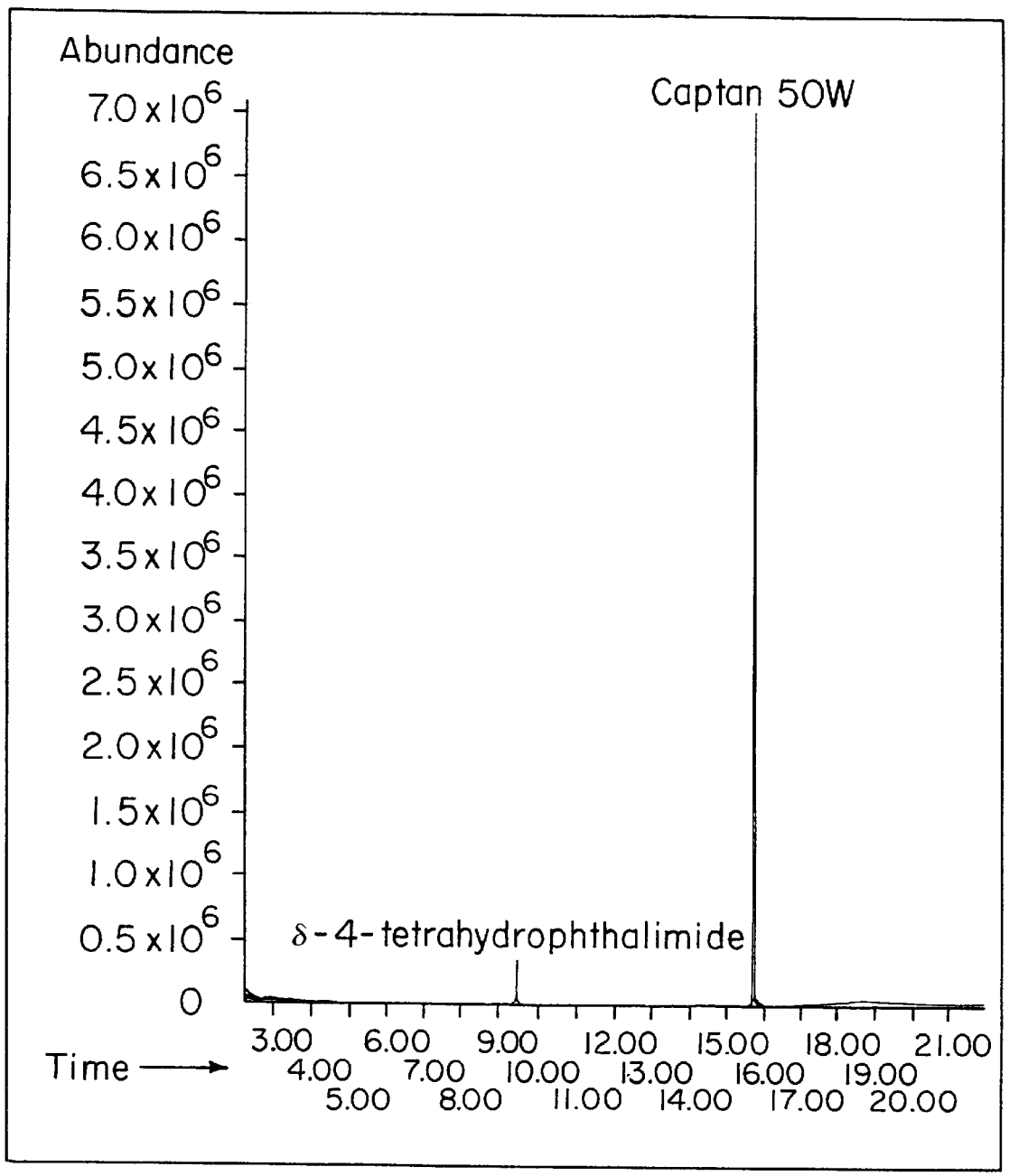
FIG. 2 is a chromatogram of surface chemicals detected on corn seeds before and after plasma treatment in accordance with the invention.
Figure 3:
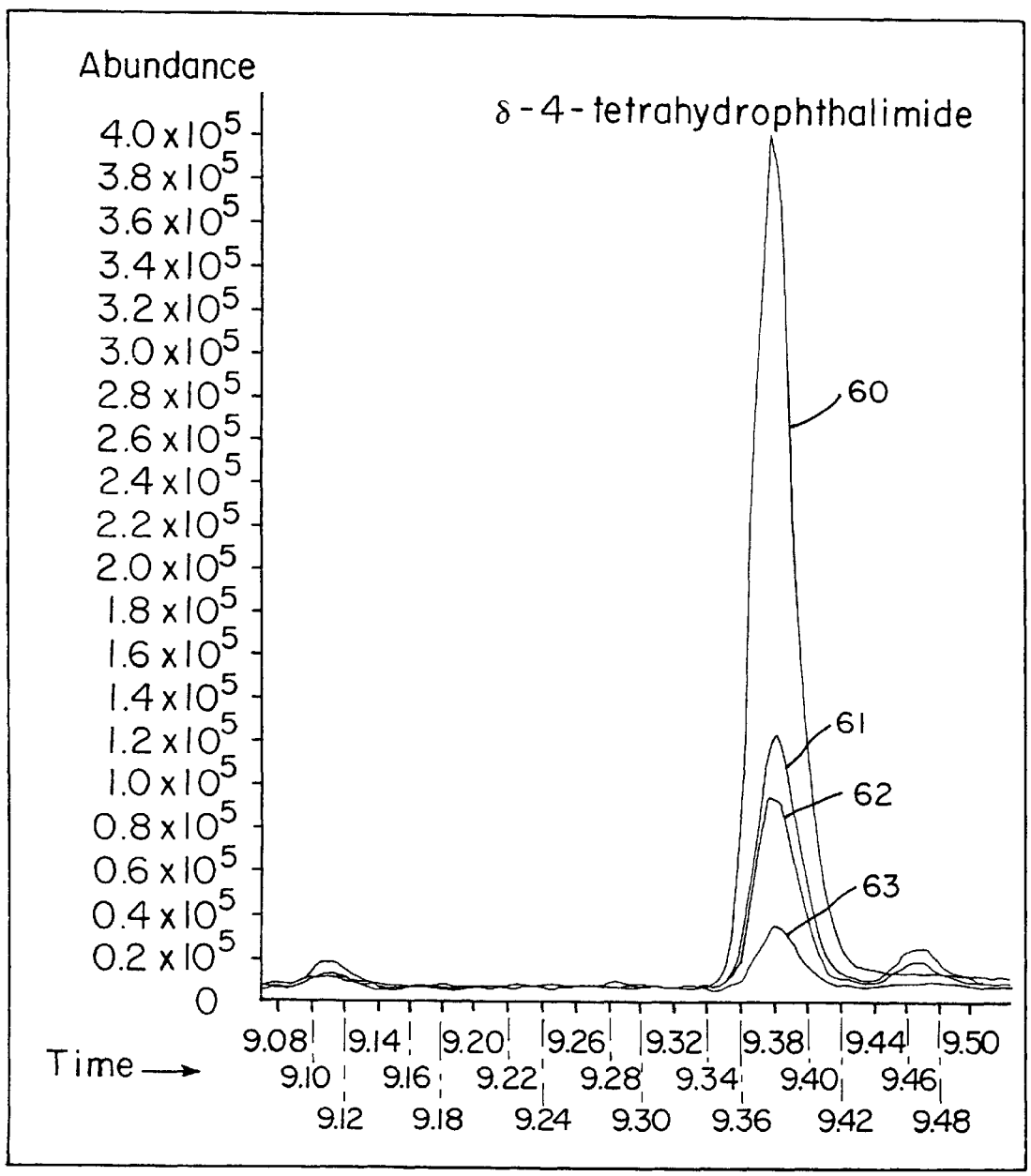
FIG. 3 is a portion of a chromatogram as in FIG. 2 showing the peak for δ-4-tetrahydrophthalimide.
Figure 4:
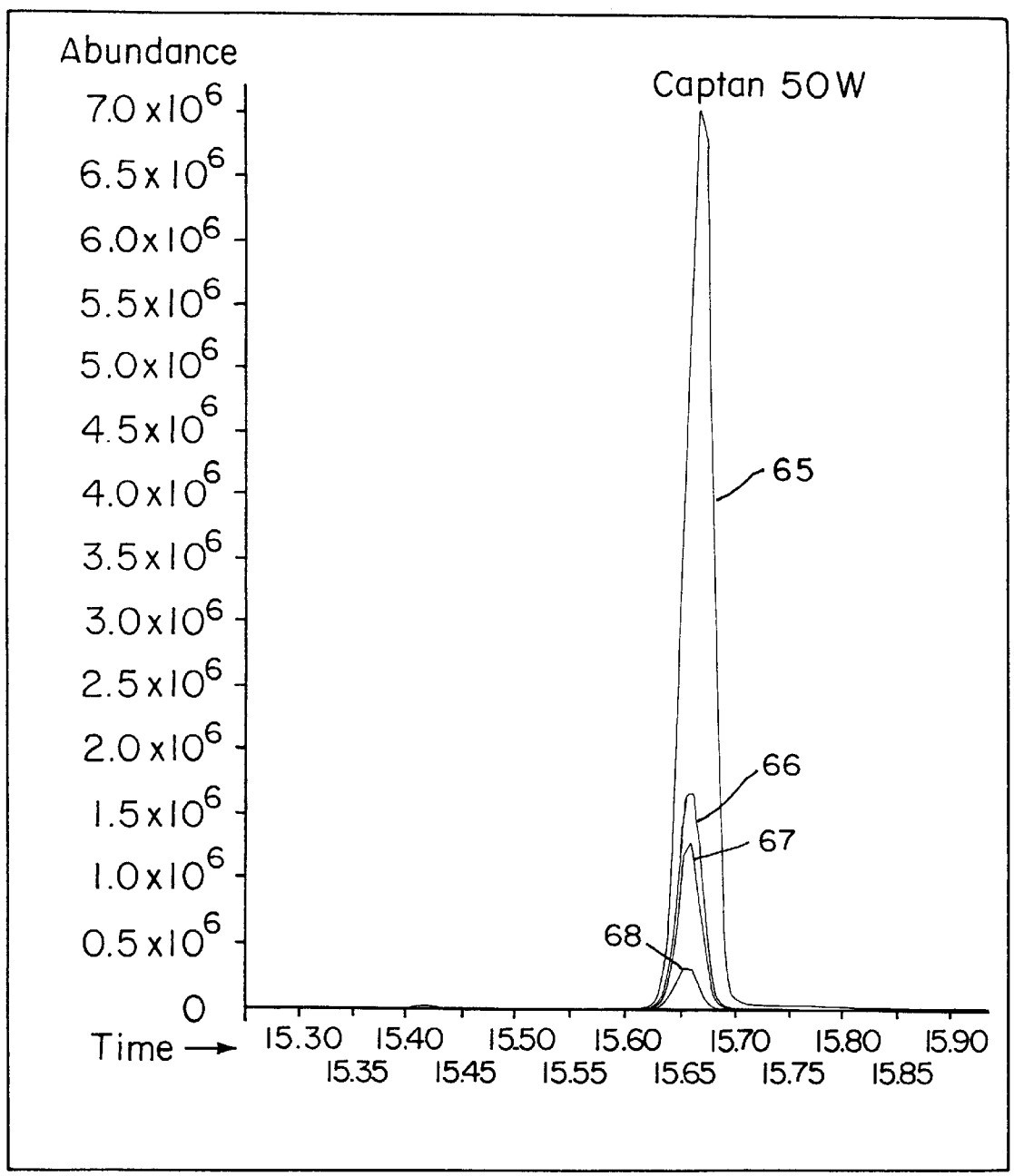
FIG. 4 is a portion of a chromatogram as in FIG. 2 showing the peak for Captan 50W.

FIG. 2 is a chromatogram obtained from the samples for: untreated (control) corn; 15 minutes of water vapor plasma treatment; 15 minutes of water vapor followed by 15 minutes of additional water vapor plasma treatment; and 30 minutes of water vapor plasma treatment followed by 15 minutes of oxygen plasma treatment. FIG. 3 is a portion of the same chromatogram on an enlarged scale illustrating the δ-4-tetrahydrophthalimide peak at 60 for the untreated corn; at 61 for the 15 minute water vapor plasma treatment corn; at 62 for the 15 minute water vapor followed by an additional 15 minute water vapor plasma treatment; and at 63 for the foregoing plasma treatment plus an additional 15 minutes of oxygen plasma treatment. FIG. 4 is a portion of the same chromatogram of FIG. 2 at an enlarged scale showing the Captan peak for the untreated corn at 65; for the 15 minute treated corn at 66; for the 15 minute water vapor treatment followed by 15 minute water vapor plasma treatment at 67; and for the foregoing treatment followed by an additional 15 minutes oxygen plasma treatment at 68. The results of these experiments show the Captan level of the plasma treated corn can be reduced to very low levels.

Seeds which were treated to remove the Captan from the surfaces of the seeds were then subjected to germination tests to determine the effect of the plasma treatment on germination. Germination tests were performed on Captan treated seeds having normal one-year carryover; on seeds from the same batch which were plasma treated in accordance with the present invention to remove the Captan service material; and on seeds that had been plasma treated and which were then retreated with Captan.

The percent germination, range of germination for the samples, and the range difference for the three types of samples under warm germination and cold germination conditions are shown in Table 2 below.

TABLE 2

| Normal | | Planted 5/24/99 Detreated | | Read 6/3/99 Retreated | |
|---|---|---|---|---|---|
| Normal 1 year Carry-over Seed Warm Germination | Normal 1 year Carry-over Seed Cold Germination | Normal 1 year Carry-over Seed Warm Germination | Normal 1 year Carry-over Seed Cold Germination | Normal 1 year Carry-over Seed Warm Germination | Normal 1 year Carry-over Seed Cold Germination |
| 94 | 93 | 87 | 54 | 85 | 57 |
| Range 92–98 | Range 92–96 | Range 84–96 | Range 46–60 | Range 84–90 | Range 54–60 |
| Range Difference 6 | Range Difference 4 | Range Difference 12 | Range Difference 14 | Range Difference 6 | Range Difference 6 |

For comparison purposes, similar germination tests were performed on seeds that were not Captan treated to compare the germination rates of the non-treated (natural surface) seeds and the germination rates of the same seeds after a plasma surface removal treatment as in the example above. The results of these tests showing the percent of warm and cold germination, the range of germination, and the range differences are given in Table 3 below.

TABLE 3

| No Plasma Treatment | | Plasma Treated | |
|---|---|---|---|
| Regular non treated Seed Warm Germination | Regular non treated Seed Cold Germination | Regular non treated Seed Warm Germination | Regular non treated Seed Cold Germination |
| 97 | 81 | 95 | 72 |
| Range 96–98 | Range 72–92 | Range 88–98 | Range 64–78 |

TABLE 3-continued

| No Plasma Treatment | | Plasma Treated | |
| --- | --- | --- | --- |
| Regular non treated Seed Warm Germination | Regular non treated Seed Cold Germination | Regular non treated Seed Warm Germination | Regular non treated Seed Cold Germination |
| Range Difference 2 | Range Difference 20 | Range Difference 10 | Range Difference 14 |

It is understood that the invention is not confined to the particular embodiments set forth herein as illustrative, but embraces such modified forms thereof as come within the scope of the following claims.

What is claimed is:

1. A method for treating seeds comprising:
   (a) igniting a cold plasma in a gas from a source of gas and maintaining the plasma under conditions that provide etching by the plasma and not deposit from the plasma;
   (b) exposing the seeds to the plasma for a selected period of time, wherein the seeds to be treated are seed corn, to plasma etch the surfaces of the seeds to remove surface material from the seeds; and
   (c) tumbling the seeds while exposing the seeds to the plasma to thereby allow the surfaces of the seeds to be etched uniformly.

2. The method of claim 1 wherein tumbling the seeds is carried out in a cylindrical walled plasma reactor having a central axis by rotating the reactor about its axis.

3. The method of claim 1 wherein igniting a plasma in the gas is carried out by capacitively coupling RF power to the gas.

4. The method of claim 3 wherein the RF power is provided at a frequency of 13.56 MHz.

5. The method of claim 1 wherein igniting a plasma in the gas is carried out by inductively coupling RF power to the gas.

6. The method of claim 1 wherein igniting a plasma is carried out by coupling RF power in pulses to the gas in a reaction chamber.

7. The method of claim 6 wherein the RF power is provided at a frequency of about 3.56 MHz.

8. The method of claim 1 further including applying moisture to the treated seeds to germinate the seeds.

9. The method of claim 1 wherein the gas in which the plasma is ignited is oxygen.

10. The method of claim 1 wherein the gas in which the plasma is ignited is selected from the group consisting of argon, air, $CF_4$, ammonia, oxygen, water vapor and mixtures thereof.

11. A method for treating seeds comprising:
    (a) igniting a cold plasma in a gas from a source of gas and maintaining the plasma under conditions that provide etching by the plasma and not deposit from the plasma;
    (b) exposing the seeds to the plasma for a selected period of time to plasma etch the surfaces of the seeds to remove surface material from the seeds, wherein the gas in which the plasma is ignited is water vapor emitted from the seeds; and
    (c) tumbling the seeds while exposing the seeds to the plasma to thereby allow the surfaces of the seeds to be etched uniformly.

12. A method for treating seeds comprising:
    (a) enclosing the seeds to be treated in a reaction chamber, wherein the seeds to be treated are seed corn;
    (b) evacuating the reaction chamber to a base level;
    (c) supplying gas to and establishing a selected gas pressure in the reaction chamber;
    (d) igniting a cold plasma in the gas in the chamber such that the plasma provides etching and not deposit from the plasma and exposing the seeds to the plasma for a selected period of time to plasma etch the surfaces of the seeds to remove surface material from the seeds; and
    (e) tumbling the seeds while exposing the seeds to the plasma to thereby allow the surfaces of the seeds to be etched uniformly.

13. The method of claim 12 wherein igniting a plasma in the gas in the chamber is carried out by capacitively coupling RF power to the gas in the chamber.

14. The method of claim 13 wherein the RF power is provided at a frequency of 3.56 MHz.

15. The method of claim 12 wherein igniting a plasma in the gas in the chamber is carried out by inductively coupling RF power to the gas in the reaction chamber.

16. The method of claim 12 wherein igniting a plasma is carried out by coupling RF power in pulses to the gas in the reaction chamber.

17. The method of claim 16 wherein the RF power is provided at a frequency of about 3.56 MHz.

18. The method of claim 12 wherein tumbling the seeds is carried out in a cylindrical walled plasma reactor having a central axis by rotating the reactor about its axis.

19. The method of claim 12 further including applying moisture to the treated seeds to germinate the seeds.

20. The method of claim 12 wherein the gas supplied to the reaction chamber is oxygen.

21. The method of claim 12 wherein the gas supplied to the reaction chamber is selected from the group consisting of argon, air, $CF_4$, ammonia, oxygen, water vapor, and mixtures thereof.

22. A method for treating seeds comprising:
    (a) enclosing the seeds to be treated in a reaction chamber;
    (b) evacuating the reaction chamber to a base level;
    (c) supplying gas to and establishing a selected gas pressure in the reaction chamber;
    (d) igniting a cold plasma in the gas in the chamber such that the plasma provides etching and not deposit from the plasma and exposing the seeds to the plasma for a selected period of time to plasma etch the surfaces of the seeds to remove surface material from the seeds, wherein the surface material removed from the seeds includes a material selected from the group consisting of fungicides, insecticides, and pesticides; and
    (e) tumbling the seeds while exposing the seeds to the plasma to thereby allow the surfaces of the seeds to be etched uniformly.

23. A method for treating seeds that have a fungicide, pesticide or insecticide coating comprising:
    (a) enclosing seeds having a coating thereon of a material selected from the group consisting of fungicides, insecticides, pesticides, and mixtures thereof in a reaction chamber;
    (b) evacuating the reaction chamber to a base level;
    (c) supplying gas to and establishing a selected gas pressure in the reaction chamber;
    (d) igniting a cold plasma in the gas in the chamber such that the plasma provides etching and not deposit from the plasma and exposing the seeds to the plasma for a selected period of time sufficient to plasma etch the surfaces of the seeds to remove the coating of surface material from the seeds and convert the coating materials to gas phase components in the reaction chamber; and (e) removing the gas phase components from the reaction chamber.

24. The method of claim 23 wherein igniting a plasma in the gas in the chamber is carried out by capacitively coupling RF power to the gas in the chamber.

25. The method of claim 24 wherein the RF power is provided at a frequency of 3.56 MHz.

26. The method of claim 23 wherein igniting a plasma in the gas in the chamber is carried out by inductively coupling RF power to the gas in the reaction chamber.

27. The method of claim 23 wherein the seeds to be treated are seed corn.

28. The method of claim 23 wherein igniting a plasma is carried out by coupling RF power in pulses to the gas in the reaction chamber.

29. The method of claim 28 wherein the RF power is provided at a frequency of about 3.56 MHz.

30. The method of claim 23 further including tumbling the seeds while exposing the seeds to the plasma.

31. The method of claim 30 wherein tumbling the seeds is carried out in a cylindrical walled plasma reactor having a central axis by rotating the reactor about its axis.

32. The method of claim 23 wherein the gas supplied to the reaction chamber is oxygen.

33. The method of claim 23 wherein the gas supplied to the reaction chamber is selected from the group consisting of argon, air, $CF_4$, ammonia, water vapor, oxygen, and mixtures thereof.

34. The method of claim 23 wherein the gas supplied to the reaction chamber is water vapor emitted from the seeds, and after the selected period of time of exposing the seeds to the plasma, further comprising evacuating the reaction chamber to a base level, supplying an external source gas to and establishing a selected gas pressure in the reaction chamber, and igniting a cold plasma in the external source gas such that the plasma provides etching and not deposit from the plasma and exposing the seeds to the plasma for a selected period of time to plasma etch the surfaces of the seeds to remove additional surface material from the seeds.

\* \* \* \* \*

UNITED STATES PATENT AND TRADEMARK OFFICE
CERTIFICATE OF CORRECTION

PATENT NO.   : 6,543,460 B1                                            Page 1 of 1
DATED        : April 8, 2003
INVENTOR(S)  : Denes et al.

It is certified that error appears in the above-identified patent and that said Letters Patent is hereby corrected as shown below:

Column 2,
Line 19, please delete "seeds.after" and replace with -- seeds after --.

Column 9,
Line 46, delete "3.56 MHz" and replace it with -- 13.56 MHz --.

Column 10,
Lines 20 and 28, delete "3.56 MHz" and replace it with -- 13.56 MHz --.

Column 11,
Lines 13 and 23, delete "3.56 MHz" and replace it with -- 13.56 MHz --.

Signed and Sealed this

Twenty-ninth Day of July, 2003

JAMES E. ROGAN
*Director of the United States Patent and Trademark Office*